Oct. 14, 1941.    R. F. SHOUP    2,258,817
VOTING MACHINE
Original Filed Jan. 12, 1939

INVENTOR
Ranson F. Shoup
BY Kenyon & Kenyon
ATTORNEYS.

Patented Oct. 14, 1941

2,258,817

UNITED STATES PATENT OFFICE 2,258,817

VOTING MACHINE

Ransom F. Shoup, Ardmore, Pa., assignor to The Shoup Voting Machine Corporation, Philadelphia, Pa., a corporation of Delaware Original application January 12, 1939, Serial No. 250,478. Divided and this application April 10, 1941, Serial No. 387,832

2 Claims. (Cl. 74—491)

This invention relates to voting machines and more especially to mechanism for supplying power to open and close the curtains and operate other portions of the machine in conjunction with the curtain operation. The invention is primarily applicable to voting machines of the type disclosed in Shoup et al. Patent No. 2,054,102 and the present application is a division of the application of Ransom F. Shoup, Ser. No. 250,478.

An object of this invention is to provide in a voting machine, mechanism by means of which a voter-actuated lever may be easily and quickly attached to or detached from the machine.

A further object of this invention is to so construct the mechanism by which force is transmitted from the lever to the remaining parts of the machine as to prevent the application of excessive force to the vote-registering mechanism.

Other objects, novel features and advantages of this invention will become apparent from the following specification and accompanying drawing, wherein.

Figure 1:
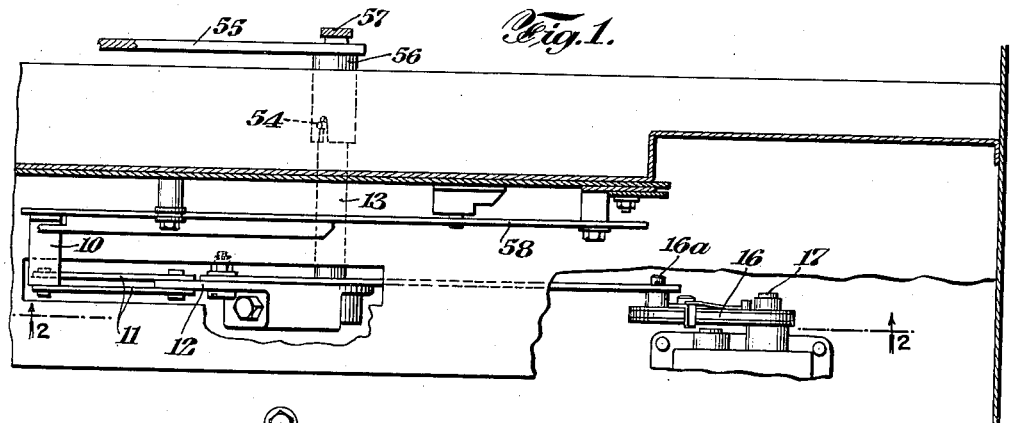
Fig. 1 is a fragmentary horizontal section through a voting machine equipped with mechanism embodying the invention, only so much of the voting machine being shown as is necessary to a complete understanding of the invention.
Figure 2:
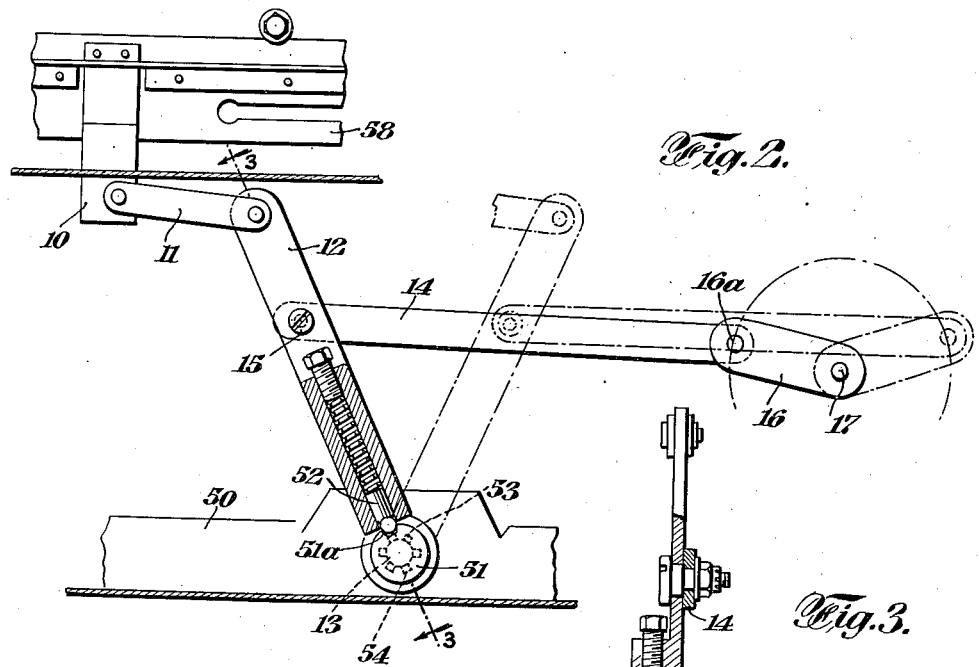
Fig. 2 is a section substantially on the line 2—2 of Fig. 1.
Figure 4:
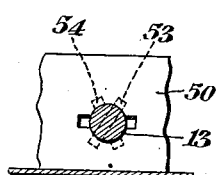
Fig. 4 is a section on the line 4—4 of Fig. 3.

In Figs. 1 and 2, 58 designates the main cam bar which is supported for horizontal reciprocation and movement of it in one direction effects closing of the curtains and release of the spindles from locked to unlocked condition and conditions the counters, while movement thereof in the reverse direction moves the curtains to open position, registers the vote and returns the counters and spindles to unoperated locked position. This cam bar is the same as the main cam bar of Shoup et al. Patent No. 2,054,102 except that it is located near the bottom of the cabinet rather than near the top thereof.

The bar 58 is provided with an arm 10 which is attached by means of a link 11 to the end of an arm 12 carried by a shaft 13 journalled near the bottom of the machine casing. A link 14 is provided at its left end with an aperture into which fits a pin 15 carried by the arm 12. The right end of the link 14 is connected to the crank pin 16a of a crank arm 16 mounted on one end of a driven shaft 17. As fully disclosed in said application, Serial No. 250,478, electrically energized driving means for the shaft 17 are provided for use in electrical operation of the machine. The present invention being limited to the mechanism for manually operating the machine, no disclosure of the electrical driving mechanism is presented herein.

Figure 3:
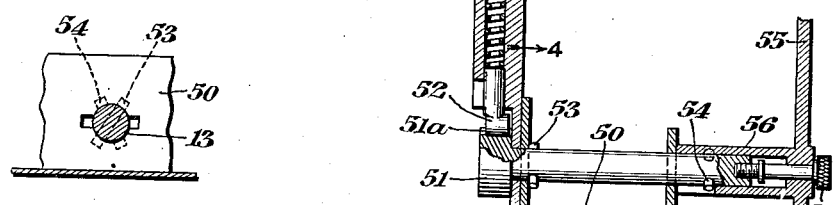
Fig. 3 is a section taken substantially on the line 3—3 of Fig. 2.

The shaft 13 is journalled in the sides of a channel member 50 and has an integral head 51 of larger diameter than the remainder. The crank 12 has an opening through which the shaft 13 extends and is arranged between the head 51 and one side of the channel member 50. The head is provided with an inwardly tapering recess 51a into which fits the correspondingly tapered end of a spring-pressed plunger 52 mounted in a housing provided on the arm 12. In the arm 12 and in both sides of the channel member 50, alined slots are provided for the purpose of permitting the passage therethrough of pins 53 and 54 extending through the shaft 13. The pins 53 prevent movement to the left of the shaft 13 (Fig. 3) as the arrangement of the slots is such that the normal operation of the arm does not rotate the shaft 13 sufficiently to bring the pins into register with the slots. The pins are brought into register with the slots only during assembly and before the arm 12 is connected to the link 11.

A handle 55 is provided for manually operating the main cam bar 58 and this handle is provided with a hollow hub 56 which fits over the shaft 13, the hub being provided with slots to receive the ends of the pin 54 for the purpose of keying the operating handle to the shaft. The handle is provided with an attachment screw 57 which is threaded into the end of the shaft 13 to prevent accidental axial movement of the handle 55 resulting in disconnection thereof from the shaft.

As disclosed in said application, Serial No. 250,478, means are provided by which rotation of the crank arm 16 may be effected by rotation of the shaft 17 or the crank arm 16 may be supported by the shaft 17 for free rotation thereon. During manual operation of the machine, the crank arm 16 swings free on the shaft 17.

The means for interconnecting the arm 12 to the shaft 13 prevents injury to the vote-registering mechanism as a result of the application of excessive force by a voter to the handle 55. Should it happen that a jam has developed in the vote registering mechanism and the voter applies to the handle 55 force beyond that normally required to operate the machine, the end of the plunger 52 slides along the side of the recess 51a, thereby disengaging the plunger from the head 51 to prevent application of excessive force to the vote-registering mechanism. Also, if with the machine set up for manual operation, a voter tries to operate the lever 55 when he is not qualified, or the machine is locked against voting, the plunger 52 releases as previously described.

I claim:

1. In a voting machine, a channel member having in its side walls alined apertures with radially extending notches, a shaft extending through said apertures and having an enlarged head, an arm arranged between one wall and said head and having an aperture with radial notches through which said shaft passes, co-acting means on said head and arm for interconnecting said arm and said shaft, pins extending radially through said shaft with the ends of one pin engaging said one wall of the channel member, and a handle having a hollow slotted hub fitting over the end of said shaft with the ends of the remaining pin arranged in the slots in said hub.

2. In a voting machine, a channel member having in its side walls alined apertures with radially extending notches, a shaft extending through said apertures and having an enlarged cylindrical head provided with an inwardly tapering notch, an arm arranged between one wall and said head and having an aperture with radial notches through which said shaft passes, a spring-pressed plunger carried by said arm and having a tapered end extending into said head notch, pins extending radially through said shaft with the ends of one pin engaging said one wall of the channel member, a handle having a hollow slotted hub fitting over the end of said shaft with the ends of the remaining pin arranged in the slots in said hub.

RANSOM F. SHOUP.